Figure 1:
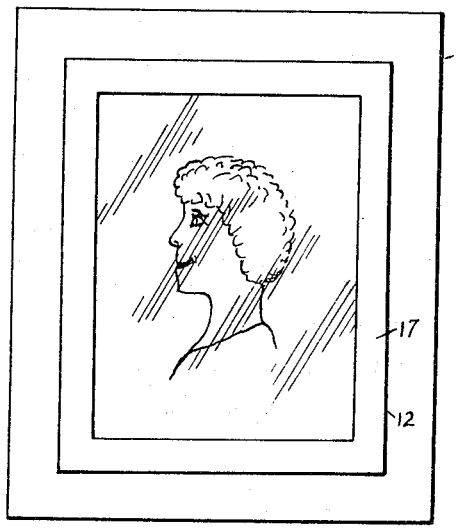

Aug. 14, 1956  N. C. FULMER  2,758,402
DISPLAY FRAME
Filed Dec. 27, 1952

INVENTOR.
Norman C. Fulmer

United States Patent Office 2,758,402
Patented Aug. 14, 1956

2,758,402

DISPLAY FRAME

Norman C. Fulmer, Montclair, N. J.

Application December 27, 1952, Serial No. 328,229

3 Claims. (Cl. 40—152.1)

This invention relates to frames or supports for holding or displaying pictures or the like.

In display frames of the prior art, it has been impossible or difficult to achieve a structure permitting quick and easy replacement of the picture or other object displayed and which is at the same time rugged, durable, and pleasing in appearance.

An object of the present invention is to provide a display frame having a pleasing appearance and in which the displayed object may readily be changed or replaced.

Figure 3:
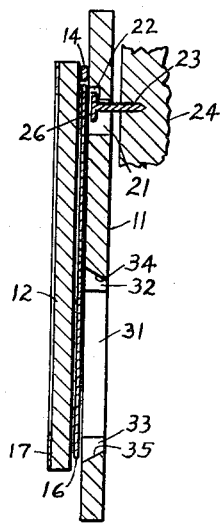
Figure 2:
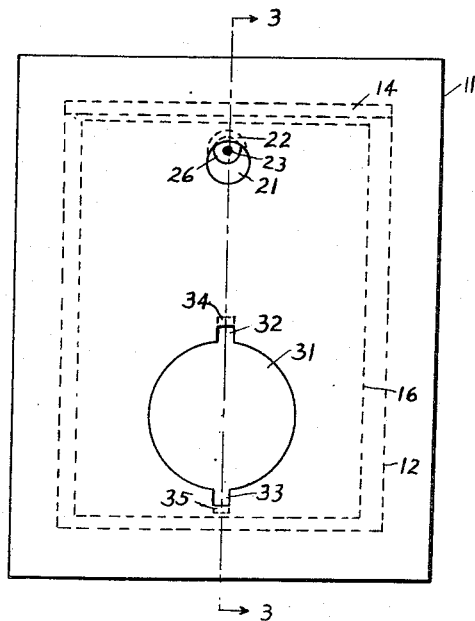
Figure 4:
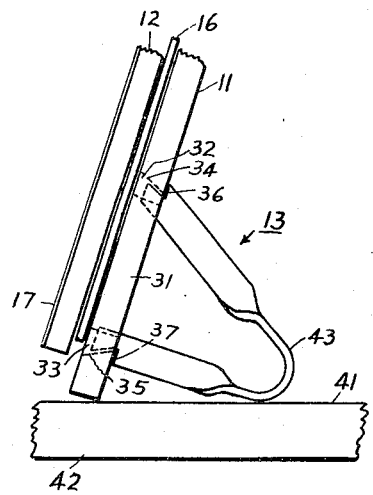

Other objects are to provide a display frame which is rugged, durable, economical to manufacture, and which is adapted for attaching to a wall and for resting on a table or the like. Still other objects will be apparent from the following disclosure and from the drawing, in which:

Figure 1 is a front view of a display frame constructed in accordance with a preferred embodiment of the invention, Figure 2 is a view of the back side of the display frame, Figure 3 is a vertical sectional view taken on the line 3—3 of Fig. 2, and Figure 4 is a partial side view of the novel display frame in combination with a support bracket and resting on a table-top.

The preferred embodiment of the invention comprises, essentially a substantially flat support member 11, a transparent window member 12, and a detachable bracket 13. The window member 12 is preferably, though not necessarily, rectangular in shape and smaller in size than the support member 11, and preferably is made from transparent plastic, whereas the support member 11 may be made from transparent, translucent, or opaque plastic or other suitable material. The window member 12 is attached, near an edge thereof, to the support member 11 by means of a strip-like spacer 14 which is cemented or otherwise fastened to both the window member 12 and the support member 11, thereby maintaining these members in approximate parallelism and sufficiently spaced apart to accommodate a picture 16, or a menu, announcement, or other thin object therebetween. The spacer 14 should be slightly thicker than the thickest object to be displayed, and the window 12 preferably is positioned so that it tends to tilt toward the support member 11 so as to resiliently clamp and hold the displayed object 16 in proper position, as will be described hereafter.

The window member 12 preferably comprises an opaque border 17 near the edges thereof, for the purpose of concealing from view the edges of the picture 16 and the spacer 14. As shown, the border 17 is painted or otherwise attached to the surface of the window 12, but may be, if desired, dyed or otherwise embedded into the window 12.

The support member 11 contains an opening 21 therethrough, preferably located above the center of gravity of the display frame and centered between the sides thereof, and hidden from view by the picture 16. A shoulder 22 is provided adjacent and above the opening 21 at the front side of the support member 11. As shown in Figs. 2 and 3, the display frame may be hung conveniently upon a nail or tack 23 partially driven into a wall 24 or other object, by placing the frame so that the opening 21 moves over the head 26 of the nail 23, whereupon the shoulder 22 permits the support member 11 to hang securely therefrom.

Another opening 31 is provided through the support member 11, preferably near the bottom and centered between the sides thereof, and hidden from view by the picture 16. The opening 31 is sufficiently large for the insertion of a finger therethrough. Slots 32, 33 are provided at the top and bottom of the opening 31, and are provided with beveled outer extremities 34, 35.

The detachable bracket 13, in its preferred form, comprises a strip-like length of resilient material, such as plastic, bent as shown in Fig. 4, and provided with beveled shoulders 36, 37 at the ends thereof adapted to fit into the slots 32, 33 and engage the beveled extremities 34, 35 thereof. The thickness of the bracket 13 may be slightly less than the width of the slots 32, 33. Portions of the shoulders 36, 37 engage against the rear surface of the support member 11 near the slots 32, 33, as shown. The resiliency of the bracket 13, tending to force the ends thereof having the shoulders 36, 37 mutually apart, insures that the bracket will securely engage the display frame and provide a unitary device which may be placed on a horizontal surface 41 of a table 42 or the like. The bracket 13 may be provided with a 90-degree twisted portion 43 which provides the proper amount of resiliency for clipping the bracket onto the display frame, and which also facilitates the bending of the bracket member, during manufacture, into approximately the shape shown in Fig. 4, so that the shoulders 36, 37 tend to spring farther apart than the spacing between the engagement slots 32, 33.

The novel slotted opening 31 serves the dual functions of providing a means for attaching the detachable support bracket 13, as has been described, and of providing a convenient means for inserting or removing the picture 16. To remove the picture 16, a finger or other object is inserted through the opening 31, pushing against the picture 16, thereby forcing the window member 12 slightly outwardly to relieve the clamping pressure, and at the same time pushing downwardly to slide the picture out of the frame.

To insert a picture into the frame, a finger is inserted through the opening 31, pushing the window 12 slightly away from the support member 11, whereupon the picture 16 may be inserted into position, the final positioning being done by friction against the picture of a finger reaching through the opening 31. Pressure of the finger against the back of the picture not only provides friction for sliding the picture, but also releases the resilient holding pressure of the window 12 which normally clamps the picture 16 securely against the support member 11.

It will be appreciated that the invention provides a pleasingly appearing display frame in which the picture or other article to be displayed may be quickly and easily inserted or removed and wherein the edges of the picture are concealed by a border, and provides a versatile display frame which may either be positioned flat against a wall or, by means of an easily attached bracket, rested on a horizontal surface.

While a preferred embodiment of the invention has been shown and described, there will occur, to those skilled in the art, various modifications thereof which will fall within the scope of the invention as defined in the following claims.

What is claimed is:

1. A display frame comprising a substantially flat support member, a substantially flat window member positioned in close planar alignment with said support member and attached along one edge thereof to said support member, said members being essentially rigid, at least one of said members being slightly resilient though essentially rigid, said window member being spaced from said support member at said edge of attachment and the rest of said window member being tilted toward said support member, a portion of said tilted window member being so close to said support member that a displayed object will be clamped in place by said members when placed therebetween.

2. A display frame comprising a substantially flat support member adapted to be positioned behind an object to be displayed, said support member having an opening extending therethrough, a pair of slots extending through said support member at diametrically opposed points at the edge of said opening, and a detachable bracket comprising a length of slightly resilient strip-like material having a greater width than thickness and having a 90-degree twisted portion intermediate the ends thereof, said bracket being bent across the width thereof in the region of said twisted portion to provide a shape in the form of an open loop with the ends thereof normally spaced farther apart than the spacing between said slots, the ends of said bracket being positioned respectively in said slots whereby said bracket is held firmly in position by the sides of said slots and by resilient engagement of said ends against the bottoms of said slots.

3. A display frame comprising a substantially flat support member, a substantially flat window member positioned in close planar alignment with said support member and attached along one edge thereof to said support member, said members being essentially rigid, at least one of said members being slightly resilient though essentially rigid, said window member being spaced from said support member at said edge of attachment and the rest of said window member being tilted toward said support member, a portion of said tilted window member being so close to said support member that a displayed object will be clamped in place by said members when placed therebetween, said support member including means adapted to receive a supporting bracket.

References Cited in the file of this patent
UNITED STATES PATENTS

| | | |
|---|---|---|
| 522,484 | Odgers | July 3, 1894 |
| 1,085,906 | Healy | Feb. 3, 1914 |
| 1,851,917 | Maggio | Mar. 29, 1932 |
| 2,253,751 | Beikirch | Apr. 26, 1941 |
| 2,521,411 | Rosenberg | Sept. 5, 1950 |
| 2,524,306 | Buzzerd | Oct. 3, 1950 |
| 2,549,026 | Skidmore | Apr. 17, 1951 |
| 2,636,702 | Brody | Apr. 28, 1953 |
| 2,641,427 | Krogh | June 9, 1953 |
| 2,677,910 | Morgan | May 11, 1954 |